US008108963B2

(12) United States Patent  
Griot et al.

(10) Patent No.: US 8,108,963 B2
(45) Date of Patent: Feb. 7, 2012

(54) WASH BUCKET WITH INTEGRAL MEASURING

(75) Inventors: Richard L. Griot, Tacoma, WA (US); Timothy Ty Willard, Federal Way, WA (US)

(73) Assignee: Griot's Garage, Inc., Tacoma, WA (US)

( * ) Notice: Subject to any disclaimer, the term of this patent is extended or adjusted under 35 U.S.C. 154(b) by 900 days.

(21) Appl. No.: 12/105,657

(22) Filed: Apr. 18, 2008

(65) Prior Publication Data

US 2009/0261012 A1   Oct. 22, 2009

Related U.S. Application Data (60) Provisional application No. 61/045,566, filed on Apr. 16, 2008.

(51) Int. Cl.
*A47L 13/50* (2006.01)
(52) U.S. Cl. .......... 15/264; 220/500; 220/501; 220/529; 366/130; 366/162.1
(58) Field of Classification Search ................ 15/209.1, 15/264; 220/500, 501, 529, 23.86, 507; 366/129, 366/130, 162.1; 73/427
See application file for complete search history.

(56) References Cited

U.S. PATENT DOCUMENTS

| 5,027,972 | A | * | 7/1991 | Bartholomew | 220/526 |
| 5,063,631 | A | | 11/1991 | Parker | |
| 5,941,410 | A | * | 8/1999 | Mangano | 220/735 |
| 6,105,813 | A | * | 8/2000 | Abbey | 220/570 |
| 6,367,409 | B1 | * | 4/2002 | Broom | 118/13 |
| 7,353,964 | B2 | * | 4/2008 | Kosmyna | 220/23.87 |
| 7,757,878 | B2 | * | 7/2010 | Mogil et al. | 220/23.89 |
| 2005/0011261 | A1 | | 1/2005 | Lyon | |
| 2007/0101532 | A1 | | 5/2007 | Young | |
| 2007/0295723 | A1 | | 12/2007 | Mak et al. | |
| 2008/0169292 | A1 | * | 7/2008 | Serrano | 220/507 |

FOREIGN PATENT DOCUMENTS

| JP | 2000060785 | 2/2000 |
| KR | 20020090399 | 9/2002 |

* cited by examiner

*Primary Examiner* — Mark Spisich
*Assistant Examiner* — Michael Jennings
(74) *Attorney, Agent, or Firm* — Davis Wright Tremaine LLP; George C. Rondeau, Jr.

(57) ABSTRACT

A wash bucket for use with detergent and water to ensure that the detergent and water are mixed in a predetermined ratio. The wash bucket has a cup within the wash bucket cavity. In some embodiments the cup is attached to the wash bucket structure and not easily removed by hand. In other embodiments the cup is removably attached to the wash bucket structure. A proper detergent to water ratio is achieved by filling the cup to a point indicated on the cup and then filling the wash bucket to a point indicated on the wash bucket.

10 Claims, 7 Drawing Sheets

WASH BUCKET WITH INTEGRAL MEASURING

This application claims benefit of prior U.S. Provisional Application No. 61/045,566, filed 16 Apr. 2008.

BACKGROUND OF THE INVENTION

1. Field of the Invention

The present invention is directed generally to wash buckets.

2. Description of the Related Art

Wash buckets are an old technology, yet one that has seen continuous innovation, much of it in the last few decades. As soon as humans learned how to make vessels for holding liquids out of clay or other simple materials, some of these vessels were probably used to hold water for washing various objects. Over time, humans developed specialized vessels for holding wash water, such as wash basins for washing ones hands and face, or a sink for washing dishes. Wash basins were shaped as shallow bowls to allow a minimum volume of water to be used for effective cleaning of face and hands and to allow for easy cleaning. Dish sinks were shaped as wide, steep walled wells to allow a maximum volume of dishes to be immersed in a minimal volume of water. Wash buckets were shaped as narrow, step-walled vessels with an open top to allow water to be carried easily to a place where something needed to be washed, and then serve as a handy repository of water close to the task. To keep the water close at hand, a bucket is more efficient if it is self-supporting. Therefore, most buckets are flat bottomed, though some have rounded bottoms with legs to maintain them upright.

The evolution of the wash bucket continued through the years. Over time, various features were added to the basic bucket form. Spouts of various types were added to make it easier to pour liquids out of the vessel. Handles of various types were added by early inventors to make the vessels easier to carry and more portable. Inventors created different types of handles including rigid handles attached to the side of a bucket, rope handles and bail handles. Inventors found new materials with which to make buckets. Buckets of fire hardened clay were easy to make, but were relatively fragile compared to other materials. Wood is a more robust material. Eventually, a wooden bucket was made from slabs of wood with one slab forming the bottom of the bucket and other slabs forming the sidewalls of the bucket, held together by rope or twine. Later, when metals became less rare, the ropes holding the bucket together were replaced by metal bands. Eventually, as metals became even more common, entire buckets were made out of metal.

After metal buckets became common, inventors discovered it was practical to add wheels to a bucket. After wheels on buckets were common, other inventors realized that the narrow and deep shape of a bucket previously designed for efficient carrying by a human could be adapted into shapes more convenient for pushing along a flat, even surface. The classic mop bucket was invented with a relatively larger bottom and shorter side walls. The elongated bottom of a bucket allowed a mop to be placed with the head in the bottom of the bucket near one end with the mop handle resting against the top of the side wall on the opposite end. This allowed a person to use the mop handle to transmit force to the mop bucket inducing the mop bucket to move along a flat surface on its wheels. In time, inventors added various types of mop ringers to the bucket, some detachable and some integral. Some ringers use of rollers to press water out of the mop, others used flat plates.

Even in recent years, inventors have continued to come up with new innovations for wash buckets. Inventors have added gratings to the bottom of a wash bucket to allow dirt and other particulates to fall out of the wash water and through the grating, allowing a wash pad or mitt to be rinsed out in the wash water without contacting dirt and particles from previous rinsings of the wash pad or mitt. This bucket with a grating bottom is more effective than previous wash buckets where the wash pad or mitt would come into contact with dirt and particulates from previous rinsings of the wash pad or mitt. This was an important innovation for washing surfaces sensitive to scratching by particulate matter adhering to the wash pad or mitt. Another recent innovation of wash buckets, patented as U.S. Pat. No. 5,983,441 on Nov. 16, 1999 separates a wash bucket into two parts. One for immersing a mop in clean, unused wash liquid and the other compartment with a ringer for squeezing used, dirty washing liquid from the mop. This invention prevents the dirty wash liquid from mixing with the clean, unused wash liquid. Another recent innovation in wash bucket design has been to replace markings on the side of the bucket that indicate the volume of liquid in the bucket with volume indicating markings on an angled ledge inside the bucket. This allows a person to read the bucket volume while standing above the bucket instead of squatting down or lifting the bucket to read the volume.

Despite all the recent innovation in wash bucket design, current wash buckets do not have any mechanism for insuring that water and detergent are mixed in the proper amounts. Liquid detergents are commonly packaged in bottles with no easy means for measuring the amount of detergent dispensed. An ordinary multi-purpose measuring cup could be used to measure the amount of detergent, however, such a cup is often not conveniently located when a wash bucket user dispenses detergent. Even if the user has a measuring cup to measure the amount of detergent dispensed and the wash bucket has markings indicating the volume of water in the bucket, the user may not remember the proper amount of detergent to add for a particular volume of wash water. Even if the user remembers a desirable ratio of detergent to wash water, calculating the amount of detergent for different volumes of water requires tedious fractional math. The result is that commonly a person filling a wash bucket with a mixture of water and detergent will not measure the amount of detergent properly but will "guestimate" the amount of detergent to use. Too much or too little detergent may end up being used, with inconsistent results.

DETAILED DESCRIPTION OF THE INVENTION

Described herein are several embodiments of a new wash bucket with an integral measuring cup. With the measuring cup integrated into the wash bucket, obtaining the desirable ratio of detergent to water can be easily achieved. The user of the wash bucket adds detergent to the cup inside the bucket to a level indicated by the cup. The user then adds water to the wash bucket to the level indicated by the bucket. The top of the water level in the wash bucket being higher than the top of the cup allows the detergent to diffuse out into the water.

Figure 1:
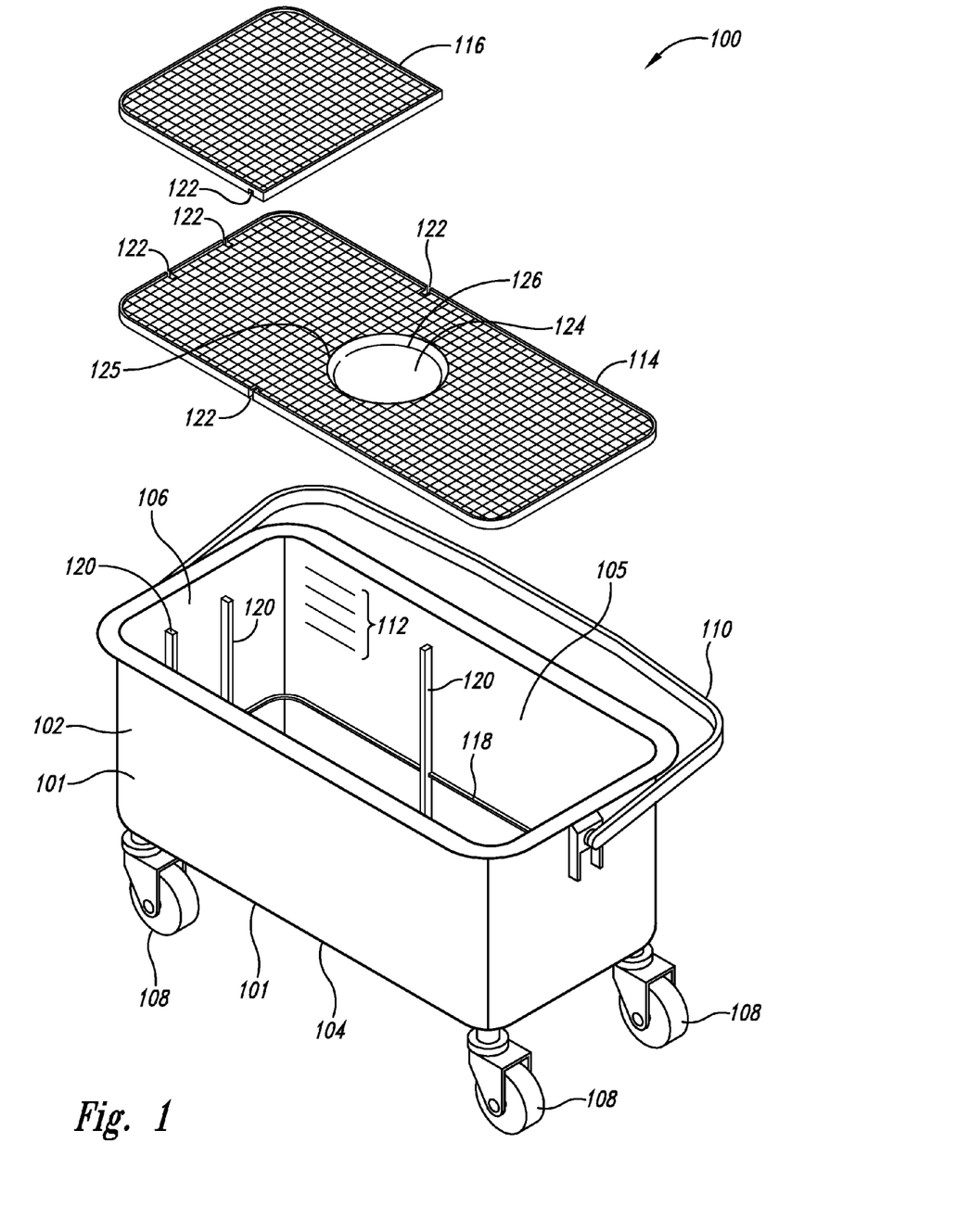
FIG. 1 shows an exploded view of a wash bucket with an integral measuring cup.

FIG. 1 shows an exploded view of a wash bucket 100 with an integral measuring cup 124. The wash bucket 100 has a bucket wall 101 that includes a side wall 102 and in most embodiments, a floor 104. A bucket cavity 105 is defined by the bucket wall 101. The wash bucket 100 shown in FIG. 1 has a rectangular shape when viewed from above and a rectangular box shape overall. In other embodiments, wash bucket 100 may have a circular shape when viewed from above, having a cylindrical shape overall. Those skilled in the art will understand that other shapes may be used for the wash bucket 100 without departing from the spirit of the invention. The wash bucket has an upwardly directed open end 106 on the top. Wheels 108 attached to the bottom of the wash bucket 100 allow the wash bucket to be easily pushed along a flat even surface. A handle 110 attached to the wash bucket 100 allows the wash bucket to be picked up and carried, primarily useful when the wash bucket is empty. Bucket fill marks 112 on the side wall 102 are placed to give indication of the volume of liquid in the wash bucket 100. Each mark represents a particular volume of liquid. The bucket fill markings 112 may include symbols. In some embodiments, the symbols can be interpreted by an observer as indicating a volume of liquid in standard units such as gallons or liters.

A lower grate or shelf 114 is positioned in the bucket cavity 105 and coupled with the bucket side wall 102. In preferred embodiments this lower shelf 114 has the same general shape as the open end 106 of the wash bucket 100 and slightly smaller than the open end 106. The lower shelf 114 rests on a small ledge 118 attached to the side wall 102 or integral with the side wall. The ledge 118 is everywhere substantially parallel to the floor of 104. In some embodiments, the ledge 118 runs continuously along the side wall 102 for the whole circumference of the wash bucket 100. In other embodiments, the ledge 118 is not continuous but intermittent. In some embodiments vertical guide rails 120 assist in positioning the lower shelf 114 within the bucket cavity 105 by aligning with notches 122 in the lower shelf 114. The lower shelf 114 is removable, held in place laterally by the bucket side wall 102. In other embodiments, the lower shelf 114 is fixed to the side wall 102 and not easily removable by hand.

The lower shelf 114 is penetrated by a plurality of holes to allow communication of water and detergent between the portion of the bucket cavity 105 above the lower shelf 114 and a portion of the bucket cavity 105 below the shelf. In the preferred embodiment, the holes through the lower shelf 114 comprise a grid. The holes through the lower shelf 114 allow dirt and other particles in the wash water to pass into the lower portion of the bucket cavity 105. This allows a wash pad or mitt to be rinsed out in the upper portion of the bucket cavity 105 and not contact dirt or particles deposited in the bucket from previous rinsings.

In some embodiments an upper grate or shelf 116 is placed within the bucket cavity 105 above and parallel to the lower shelf 114. In some embodiments, the upper shelf 116 may have a plurality of holes from the top of the shelf to the bottom of the shelf. In some embodiments, these holes in the upper shelf 116 form a grid. The upper shelf 116 is placed in the bucket cavity 105 higher than the typical wash water level. This allows the user of the wash bucket 100 to place objects such as wash pad or mitt that have become wet in the wash water on the upper shelf 116 so that they may drain off. In preferred embodiments, the upper shelf 116 is significantly smaller than the open end 106 of the wash bucket 100. The upper shelf 116 extends across the full width of the short axis of the open end 106, but only extends one-half or less of the length of the long axis of the open end 106. This allows the user of the wash bucket 100 to freely access wash water inside the bucket cavity 105.

The cup 124 is placed in the interior of the wash bucket cavity 105 and is coupled with the wash bucket 100. In the embodiment shown, the cup 124 is coupled with the wash bucket 100 by forming the cup as an integral part of the lower shelf 114. In other embodiments, the cup 124 may be attached to the floor 104 directly or to the side wall 102. Placing the cup 124 in the lower shelf 114 has several advantages. First, if the lower shelf 114 is removable, then the wash bucket 100 has less interior structure fixed to it, having more interior structure could make the wash bucket 100 more difficult to clean and may present obstacles for alternative uses for the was bucket. In some embodiments, the cup 124 may be placed in the upper shelf 116.

In some embodiments the cup 124 is attached to the wash bucket 100 and cannot be easily removed by hand. In other embodiments, the cup 124 is attached to the structure of the wash bucket 100 in a manner that can be easily removed by hand such as by being integrally formed with the removable lower shelf 114 or by being releasably attached by a twist and lock mechanism, a suction mechanism or a clip mechanism. In some embodiments, the cup 124 is positioned within a recess or hole 125 in the lower shelf 114. In some embodiments the hole 125 may be slightly smaller than the cup 124, thus holding the cup securely against lateral forces and downward forces, but not against upward forces, with the cup remaining in that position due to the force of gravity. In other embodiments the cup 124 may be removably received in a hole in another structure of the wash bucket 100.

In some embodiments, one or more cup fill marks 126 are placed on the cup 124. Each of the cup fill marks 126 indicate the particular volume of liquid present in the cup 124 when the top of the liquid is even with one of the marks. In some embodiments the cup fill marks 126 include symbols that a user of the wash bucket 100 can easily interpret as standard units of volume such as milliliters or fluid ounces. In some embodiments, the cup fill marks 126 include symbols that correspond to symbols included in the bucket fill marks 112. These corresponding symbols indicate that when the wash bucket 100 is filled with water to particular one of the bucket fill marks 112, identified by a particular symbol, then the cup fill mark 126 with the corresponding symbol indicates that the cup 124 should be filled with detergent to that cup fill mark 126 in order to obtain wash water with the proper detergent/water ratio.

For example, the bucket fill marks 112 could be four different marks. The first bucket fill mark 112 could have as a symbol "one gallon" indicating when the wash bucket 100 was filled with water to that mark, then the bucket would contain one gallon of water. The second bucket fill mark 112 could have a symbol "two gallons" indicating that when the wash bucket 100 was filled to that mark, then it will contain two gallons. The third and fourth bucket fill marks 112 could have symbols "three gallons" and "four gallons" respectively. The cup 124 could then have four corresponding cup markings 126. The first cup mark 126, the lowest in the cup, could include a symbol "one gallon." This would not indicate that the cup 124 filled to the first mark 126 contains one gallon of liquid. Rather, it would indicate that to achieve a water to detergent ratio that is optimal when the wash bucket 100 is filled with one gallon of water, then the cup 124 should be filled to the mark 126 with the symbol "one gallon." Similarly, the other three cup marks 126 have symbols reading "two gallons", "three gallons", "four gallons." In another embodiment, the bucket fill marks 112 could include four marks. The first bucket fill mark 112 with a symbol "A", the second bucket fill mark 112 with the symbol "B", the third bucket fill mark 112 with the symbol "C" and the fourth bucket fill mark 112 with the symbol "D". This set of symbols would indicate that when the user of the wash bucket 100 fills the cup 124 with detergent to the cup fill mark 126 with a symbol "A" then the user should fill the wash bucket 106 with water up to the bucket fill mark 112 with the symbol "A" to achieve the proper water to detergent ratio.

In some embodiments, there is only a single bucket fill mark 112 and a single corresponding cup fill mark 126. Both the bucket fill mark 112 and the cup fill mark 126 have a level indicator mark but not an identifying symbol. In other embodiments, there is a single bucket fill mark 112 and a plurality of cup fill marks 126. Each of the cup fill marks 126 represents the volume of a different type of detergent to add to achieve a predetermined detergent to water ratio for that type of detergent. In other embodiments, there is a single cup fill mark 126 and a plurality of bucket fill marks 112. Each of the bucket fill marks 126 represents the volume of water to add when a different type of detergent is added to the cup 124 up to the cup fill mark 126 to achieve a predetermined detergent to water ratio for that type of detergent. In yet other embodiments, wash bucket 100 has a single bucket fill mark 112 and the cup 124 has no cup fill marks 126. In this embodiment, the proper detergent to water ratio is achieved by completely filling the cup 124 with detergent and filling the wash bucket 100 with water up to the bucket fill mark 112.

In some embodiments, multiple removable cups 124 are provided and used interchangeably. Each cup 124 can be used for different application or type of detergent which would require a different detergent to water ratio. For example, one cup may be for applications or detergents where a four ounce to one gallon detergent to water ratio is desired. This cup 124 would have a first cup fill mark 126 indicating four ounces of fluid in the cup and would have a symbol that corresponded to a bucket fill mark 112 indicating the one gallon level in the wash bucket 100. Another cup 124 could be for situations calling for a six ounce to one gallon detergent to water ratio. This cup 124 would have a first cup fill mark 126 at a level indicating six ounces of fluid in the cup and with a symbol corresponding to a bucket fill mark 112 that indicates the level when the wash bucket 100 is filled with one gallon of liquid.

In other embodiments with removable cups 124, each cup has no cup fill marks 126 and each cup when completely filled has a different volume. The cup 124 may have a symbol on it that corresponds with a symbol on one of the bucket fill markings 112, indicating that to achieve the proper detergent to water ratio when the cup 124 is completely filled with detergent, the wash bucket 100 should be filled to the bucket fill mark 112 with the corresponding symbol.

In some embodiments, the wash bucket 100 has multiple cups 124 placed in the bucket cavity 105 and coupled with the structure of the wash bucket 100. In this embodiment, the bucket fill marks 112 each correspond to the number of cups 124 that would be needed to be completely filled with detergent to achieve the proper detergent to water ratio when the wash bucket 100 is filled to that bucket fill mark 112. Alternatively, the multiple cups 124 could each have a different volume. The wash bucket 100 would have bucket fill marks 112 each including a symbol indicating which of the cups 124 should be completely filled with detergent when the wash bucket is filled with water to that bucket fill mark 112.

Figure 2:
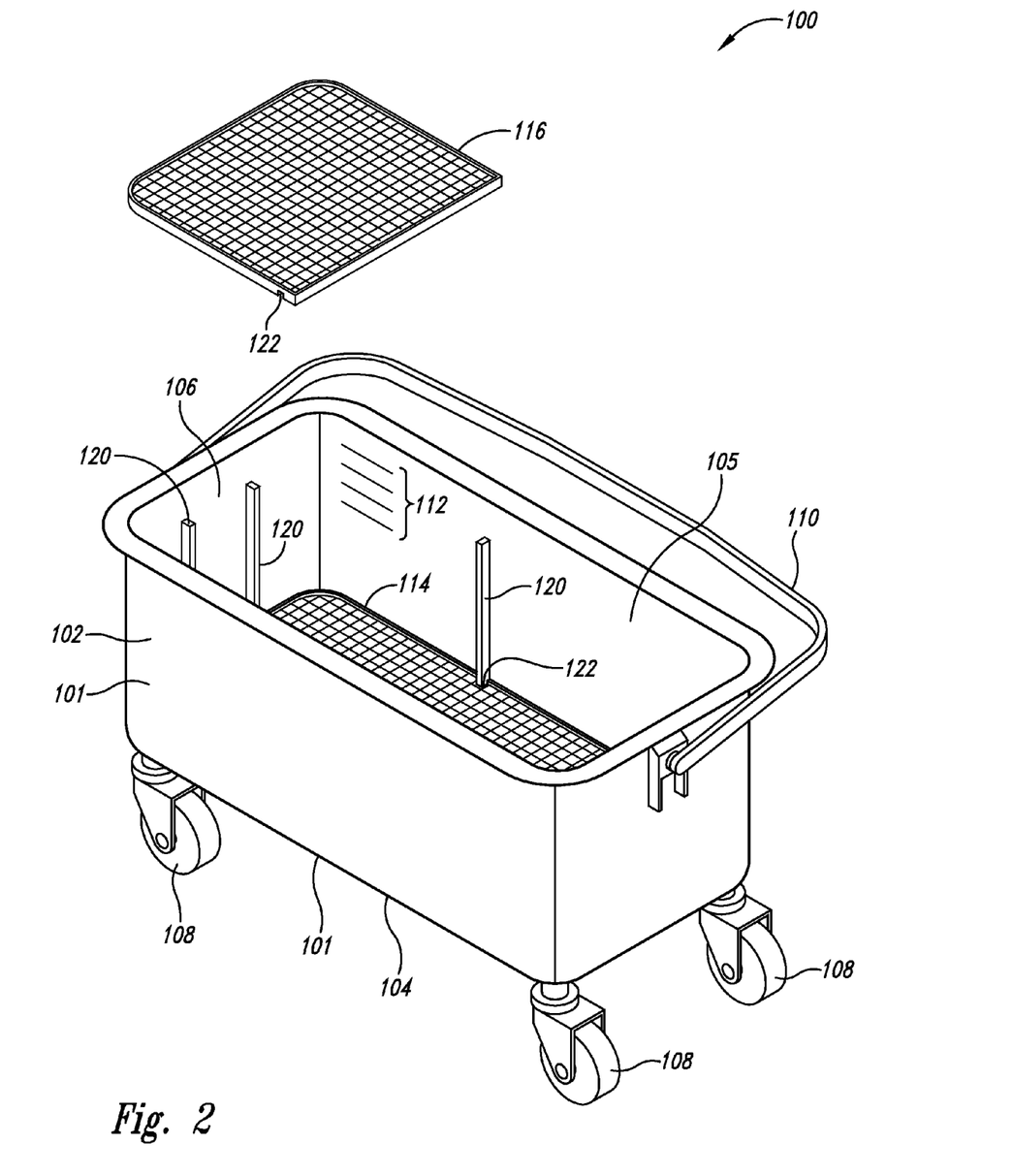
FIG. 2 shows the wash bucket of FIG. 1 with the lower shelf positioned inside the wash bucket in the shelf's normal operating position.

FIG. 2 shows the wash bucket 100 with the lower shelf 114 positioned inside the wash bucket 100 in the shelf's normal operating position. The upper shelf 116 remains removed from its normal operating position.

Figure 3:
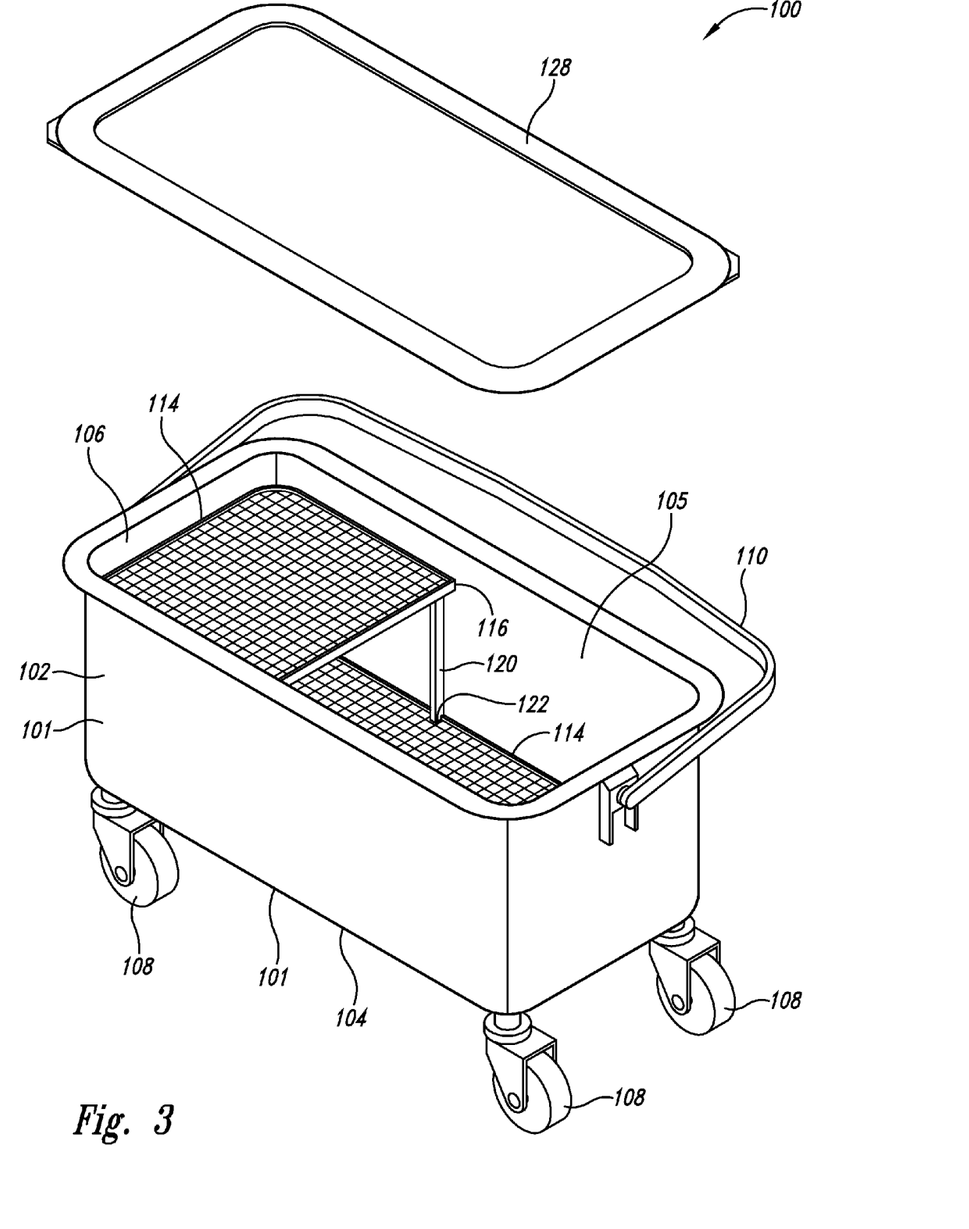
FIG. 3 shows the wash bucket of FIG. 1 with both the lower shelf and upper shelf in their normal operating positions with a lid positioned above the wash bucket.

FIG. 3 shows the wash bucket 100 with both the lower shelf 114 and upper shelf 116 in their normal operating positions. A lid 128 is shown above the wash bucket 100 that can be attached to the wash bucket 100 covering the open end 106.

Figure 4:
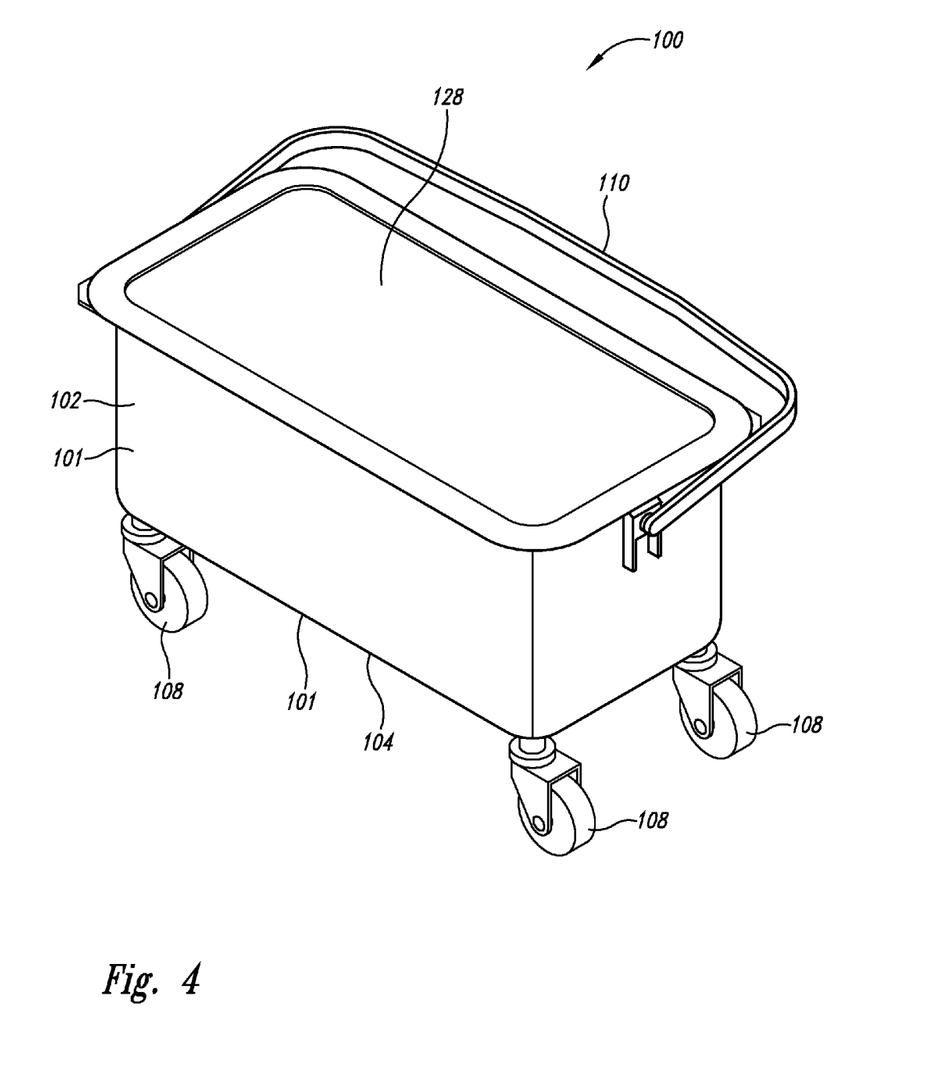
FIG. 4 shows the assembled wash bucket FIG. 3 with the lid attached.

FIG. 4 shows the wash bucket 100 with the lid 128 attached.

Figure 5:
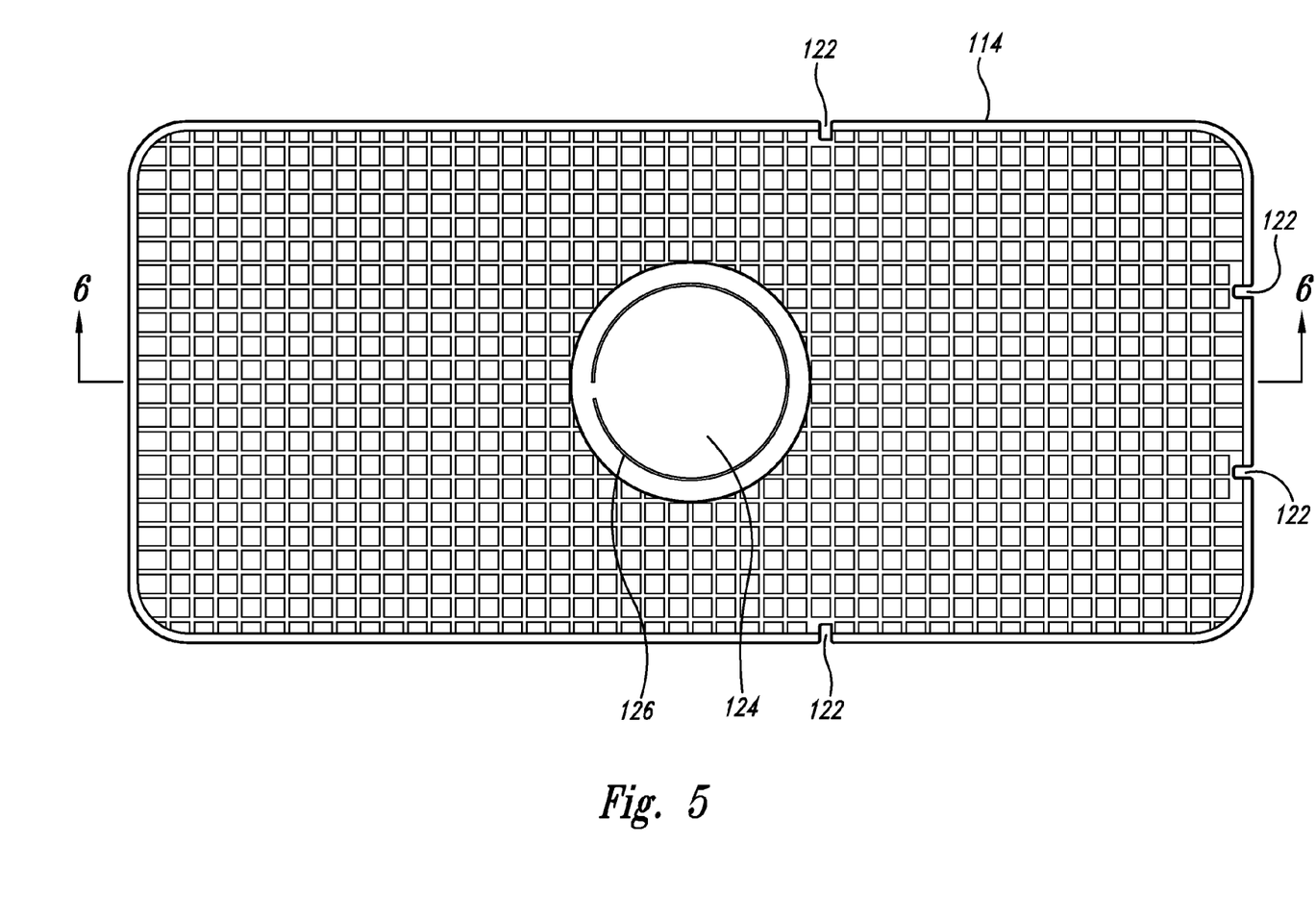
FIG. 5 shows a top plan view of the lower shelf used in the wash bucket of FIG. 1.

FIG. 5 shows a top plan view of the lower shelf 114. The cup 124 is shown as placed in the center of the lower shelf 114 within the hole 125, either being integrally formed with the lower shelf or as a removable part. However, those with skill in the art will appreciate that cup 124 may be placed closer to one edge of the shelf 114 than to other edges of the shelf. The cup 124 is shown with the circular shape as seen from overhead. Those with skill in the art will appreciate that other shapes may be used, such as square or hexagonal. The cup 124 is shown with a single cup fill mark 126. As explained above, the cup 124 in some embodiments may have multiple cup fill lines 126 or no cup fill lines. The cup fill line 126 is shown as almost completely encircling the cup. In other embodiments the cup fill mark 126 may be smaller and cover a smaller fraction of the circumference of the cup 124.

Figure 6:
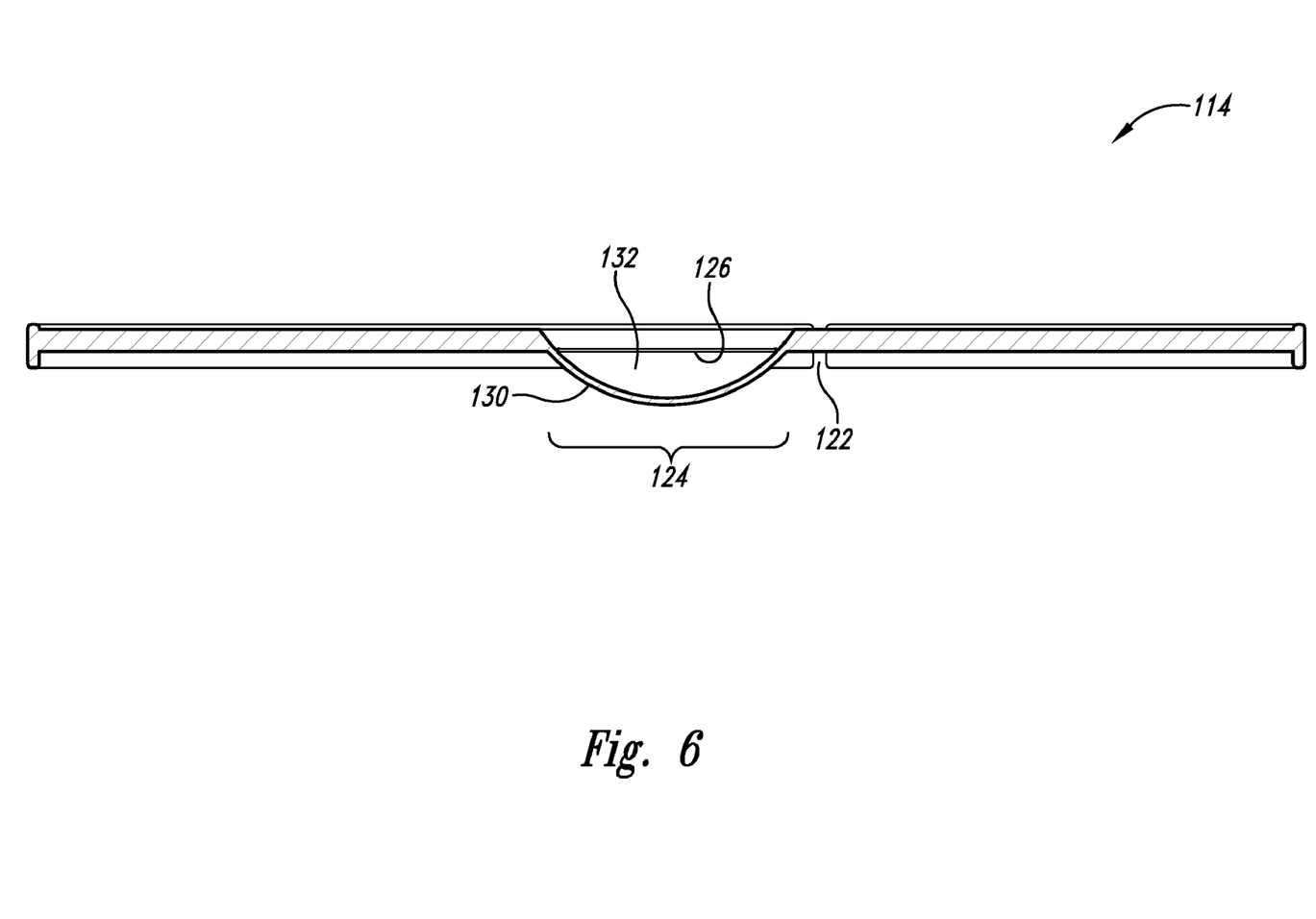
FIG. 6 shows a cross-sectional view of the lower shelf taken substantially along the line 6-6 of FIG. 5.

FIG. 6 shows a cross-sectional view of the lower shelf 114. The cup 124 is shown as an integral component of the shelf 114. As described above, in some embodiments, the cup 124 may be a detachable and removable component that either snaps in, clips in, or rests in the shelf 114. As shown, the cup 124 has a single cup fill mark 126 coincidental with the lower edge of the shelf 114. However, the cup fill mark 126 may be placed higher or lower in the cup 124 to properly coordinate with the bucket fill marks 112 in insuring the proper detergent to water ratio is achieved.

The cup 124 has a cup wall 130 that defines a cup cavity 132. The cup 124 is shown as having a shallow bowl shape. This shape allows the user of the wash bucket 100 to easily push a wash pad or mitt into the bowl 124 displacing any detergent in the bowl out into the larger wash bucket cavity 105 in an effort to insure that all the detergent placed in the bowl 124 is mixed into the wash water. The shallow bowl shape of the cup 124 also makes the cup easy to clean after use. Most general purpose measuring cups do not have a shallow bowl shape since once liquid is placed in a shallow bowl the liquid can easily spill out with even slight lateral motion imparted to the cup. This is inconvenient when the cup has to be moved after measuring. This is not an issue in the embodiment shown here. Once detergent has been placed in the cup 124 the cup does not have to be moved before the wash bucket 100 is filled with water. Even if the cup 124 experiences lateral movement and detergent spills out of the cup, this is not an issue because the detergent will merely spill out into the larger bucket cavity 105, which the detergent would soon have escaped to anyway once the user filled the wash bucket 100 with water. Those with skill in the art will appreciate that shapes other than a shallow bowl shape could be used for the cup 124 without departing from the invention.

Figure 7:
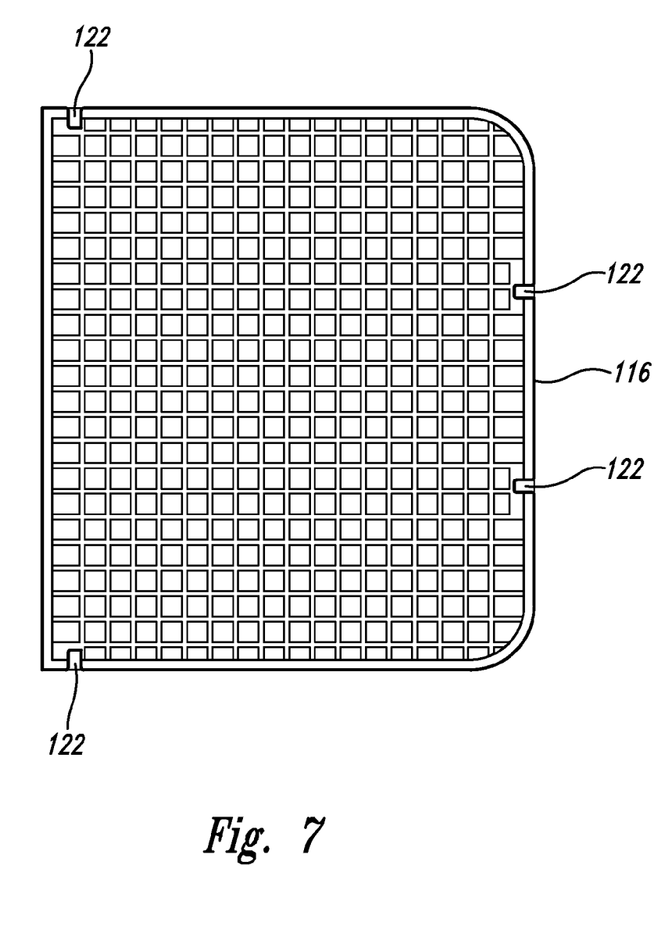
FIG. 7 shows an underside view of the upper shelf.

FIG. 7 shows an underside view of the upper shelf 116. In one embodiment, the upper shelf 116 is supported in its position in the bucket cavity 105 with vertical guide rails 120 engage with shelf notches 122. This makes the upper shelf 116 easily removable. In other embodiments, the upper shelf 166 may be removably placed in the bucket cavity 105 by other means. In yet other embodiments the upper shelf 116 may be attached to the bucket side wall 102 in a way that is not easily removed by hand, such as by screws or rivets.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A wash bucket for use with a detergent and water in a predetermined ratio, comprising:
    a bucket wall defining a bucket cavity with an upwardly open upper end;
    a cup having a cup wall defining a cup cavity with an upwardly open upper end;
    a bucket fill mark on the bucket wall at a location indicating the level to which the bucket cavity is to be filled with water;
    a cup fill mark on the cup wall at a location indicating the level to which the cup cavity is to be filled with the detergent; and
    a shelf positioned in the bucket cavity and coupled with the bucket wall, the shelf dividing the bucket cavity into upper and lower bucket cavity portions, the shelf having a plurality of holes configured to allow communication of water and detergent between the upper and lower bucket cavity portions, the shelf further having a cup hole within which the cup is positioned for supporting the cup with the cup open end upward, the shelf positioned at a location within the bucket cavity to hold the cup with the cup open end below the bucket fill mark such that after the cup cavity is filled with the detergent to the cup fill mark the bucket cavity can be filled with water to the bucket fill mark to produce a combination of the detergent and water in the predetermined ratio within the bucket cavity.

2. A wash bucket for use with a detergent and water in a predetermined ratio, comprising:
    a bucket wall defining a bucket cavity with an upwardly open upper end, the bucket wall comprising a bucket floor and a side wall;
    a cup having a cup wall defining a cup cavity with an upwardly open upper end;
    a bucket fill mark on the bucket wall at a location indicating the level to which the bucket cavity is to be filled with water;
    a cup fill mark on the cup wall at a location indicating the level to which the cup cavity is to be filled with the detergent; and
    a shelf positioned in the bucket cavity above the bucket floor and coupled with the side wall, the shelf dividing the bucket cavity into upper and lower bucket cavity portions, the shelf having a plurality of holes configured to allow communication of water and detergent between the upper and lower bucket cavity portions, the shelf supporting the cup with the cup open end upward and above the bucket floor, the shelf positioned at a location within the bucket cavity to hold the cup with the cup open end below the bucket fill mark such that after the cup cavity is filled with the detergent to the cup fill mark the bucket cavity can be filled with water to the bucket fill mark to produce a combination of the detergent and water in the predetermined ratio within the bucket cavity.

3. A wash bucket for use with a detergent and water in a predetermined ratio, comprising:
    a bucket having a bucket wall defining a bucket cavity with an upwardly open upper end;
    a cup having a cup wall defining a cup cavity with an upwardly open upper end, the cup open end being positioned below the bucket upper end such that detergent can be placed in the cup cavity and then water placed in the bucket cavity to a level where the water rises above the cup open end to produce a combination of the detergent and water in the predetermined ratio within the bucket cavity; and
    a shelf positioned in the bucket cavity and coupled with the bucket wall, the shelf dividing the bucket cavity into upper and lower bucket cavity portions, the shelf having a plurality of holes configured to allow communication of water and detergent between the upper and lower bucket cavity portions, the shelf supporting the cup with the CUP open end upward and above the lower bucket cavity portion, the shelf positioned at a location within the bucket cavity to hold the cup with the cup open end below the upper bucket cavity.

4. A wash bucket for use with a detergent and water in a predetermined ratio, comprising: a bucket wall defining a bucket cavity with an upwardly open upper end; a cup having a cup wall defining a cup cavity with an upwardly open upper end, the cup being positioned in the bucket cavity and coupled with the bucket wall with the cup open end upward, the cup cavity being sized to hold sufficient detergent to produce a combination of the detergent and water in the predetermined ratio within the bucket cavity when the detergent placed in the cup cavity is combined with the water placed in the bucket cavity;

a plurality of bucket fill marks at locations indicating the levels to which the bucket cavity can be filled with water;

a plurality of cup fill marks at a location indicating the levels to which the cup cavity can be filled with the detergent, each cup fill mark corresponding to one of the bucket fill marks to indicate the corresponding levels to which the cup cavity and the bucket cavity can be filled with the detergent and water, respectively, to produce a combination of the detergent and water in the predetermined ratio within the bucket cavity when the detergent placed in the cup cavity is combined with the water placed in the bucket cavity; and a shelf coupled with the bucket wall and coupling the cup to the bucket wall.

5. The wash bucket of claim 4, wherein one of the cup fill marks is the cup open end.

6. The wash bucket of claim 5, wherein the shelf comprises a cup hole sized to receive the cup therein.

7. The wash bucket of claim 6, wherein the cup hole is sized to hold the cup with the cup open end flush with an upper side of the shelf.

8. The wash bucket of claim 6, wherein the cup is fixedly attached to the shelf.

9. The wash bucket of claim 4, wherein the cup is removably coupled to the bucket wall.

10. The wash bucket of claim 4, wherein the cup cavity has a bowl shape.

* * * * *